(12) United States Patent
Gladney et al.

(10) Patent No.: US 8,099,811 B2
(45) Date of Patent: *Jan. 24, 2012

(54) MULTI-STRANDED COIL SPRING

(75) Inventors: Richard F. Gladney, Fairburn, GA (US); Bernard W. Kuchel, King, NC (US); Michael S. DeFranks, Decatur, GA (US)

(73) Assignee: Dreamwell, Ltd., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/699,184

(22) Filed: Jan. 29, 2007

(65) Prior Publication Data

US 2007/0118987 A1      May 31, 2007

Related U.S. Application Data (63) Continuation of application No. 10/782,050, filed on Feb. 19, 2004, now Pat. No. 7,168,117, which is a continuation-in-part of application No. 10/688,852, filed on Oct. 15, 2003, now Pat. No. 6,944,899, which is a continuation-in-part of application No. 10/371,177, filed on Feb. 19, 2003, now Pat. No. 7,047,581.

(60) Provisional application No. 60/512,115, filed on Oct. 17, 2003.

(51) Int. Cl.
*A47C 23/04*     (2006.01)
*A47C 27/04*     (2006.01)
*F16F 1/06*      (2006.01)
*F16F 3/093*     (2006.01)

(52) U.S. Cl. .......... 5/716; 5/720; 5/655.7; 5/655.8; 5/256; 267/180

(58) Field of Classification Search .......... 5/716, 654.1, 5/655.7, 642, 256, 720, 718, 655.8, 717; 267/166, 167, 180
See application file for complete search history.

(56) References Cited

U.S. PATENT DOCUMENTS

| | | | |
|---|---|---|---|
| 15,869 A | 10/1856 | French | |
| 99,475 A * | 2/1870 | Rhinelander | 267/166 |
| 149,758 A | 4/1874 | Junge | |
| 274,715 A * | 3/1883 | Buckley | 267/180 |
| 374,658 A * | 12/1887 | Collom | 5/256 |
| 683,344 A * | 9/1901 | Sim | 5/258 |
| 685,160 A | 10/1901 | Mattress | |
| 698,529 A * | 4/1902 | Marshall | 5/720 |
| 837,751 A * | 12/1906 | Summer | 5/246 |
| 1,192,510 A | 7/1916 | Fischmann | |
| 1,451,936 A | 4/1923 | Young | |
| 1,493,179 A | 5/1924 | Young et al. | |

(Continued)

FOREIGN PATENT DOCUMENTS

CH          637739          8/1983

(Continued)

OTHER PUBLICATIONS

Wallingford Bicycle Parts (http://wallbike.com/Products.html) The Brooks B.33 Saddle, Published before or on Apr. 19, 2000.

(Continued)

*Primary Examiner* — Robert G Santos
(74) *Attorney, Agent, or Firm* — Cantor Colburn LLP (57) ABSTRACT

A spring assembly including a helical coil formed from a multi-strand cord.

23 Claims, 6 Drawing Sheets

Stranded Wire Coil

U.S. PATENT DOCUMENTS

| | | | |
|---|---|---|---|
| 1,544,237 A | | 6/1925 | Karr |
| 1,931,744 A | * | 10/1933 | Taylor ............................ 5/655.8 |
| 2,398,237 A | | 4/1946 | Marsack |
| 2,918,271 A | | 12/1959 | Crites |
| RE24,914 E | * | 12/1960 | Koenigsberg ..................... 5/718 |
| 3,425,068 A | * | 2/1969 | Bechtoldt ....................... 5/655.8 |
| 3,618,146 A | * | 11/1971 | Ferdinand ......................... 5/717 |
| 3,822,426 A | * | 7/1974 | Mistarz ............................. 5/717 |
| 3,985,097 A | * | 10/1976 | Sitton ............................ 118/425 |
| 4,025,681 A | | 5/1977 | Donnelly et al. |
| 4,260,143 A | | 4/1981 | Kliger |
| 4,473,217 A | | 9/1984 | Hashimoto |
| 4,753,423 A | | 6/1988 | Ukai et al. |
| 4,811,439 A | * | 3/1989 | Siegel et al. ...................... 5/718 |
| 4,869,471 A | | 9/1989 | Schwarz et al. |
| 4,889,327 A | | 12/1989 | Seyler |
| 4,983,144 A | | 1/1991 | Ojima |
| 4,991,827 A | | 2/1991 | Taylor |
| 5,040,255 A | | 8/1991 | Barber, Jr. |
| 5,098,493 A | | 3/1992 | Taylor |
| 5,137,013 A | | 8/1992 | Chiba et al. |
| 5,210,890 A | * | 5/1993 | Hagglund ......................... 5/239 |
| 5,310,167 A | | 5/1994 | Noll, Jr. |
| 4,889,327 A | | 12/1994 | Seyler |
| 5,537,699 A | | 7/1996 | Bonaddio et al. |
| 5,548,898 A | | 8/1996 | Noll, Jr. |
| 5,724,686 A | * | 3/1998 | Neal ................................ 5/717 |
| 5,756,022 A | * | 5/1998 | Siegel et al. ................. 264/46.7 |
| 5,868,383 A | * | 2/1999 | Codos ............................. 267/80 |
| 6,220,586 B1 | | 4/2001 | Pavlin et al. |
| 6,295,891 B1 | | 10/2001 | Velte et al. |
| 6,944,899 B2 | * | 9/2005 | Gladney ............................ 5/716 |
| 7,047,581 B2 | * | 5/2006 | Gladney ............................ 5/716 |
| 7,168,117 B2 | * | 1/2007 | Gladney et al. ................... 5/716 |
| 2004/0158929 A1 | * | 8/2004 | Gladney ............................ 5/716 |
| 2004/0158930 A1 | * | 8/2004 | Gladney ............................ 5/716 |
| 2005/0005354 A1 | * | 1/2005 | Gladney et al. ................... 5/256 |
| 2007/0118987 A1 | * | 5/2007 | Gladney et al. ................... 5/256 |
| 2009/0261518 A1 | * | 10/2009 | DeFranks et al. ............. 267/166 |

FOREIGN PATENT DOCUMENTS

| | | |
|---|---|---|
| DE | 300804 | 11/1916 |
| DE | 815 907-DE | 10/1951 |
| DE | 002620149 B1 | 11/1977 |
| DE | 3900473 | 7/1990 |
| GB | 000020583 | 6/1911 |
| JP | 357069125 A | 4/1982 |
| JP | 357069126 A | 4/1982 |
| JP | 357969123 A | 4/1982 |
| JP | 58091940 | 6/1983 |
| JP | 03066957 A | 3/1991 |
| JP | 10184751 A | 7/1998 |

OTHER PUBLICATIONS

The Deactivated Gun Collector's Association (SIG-Sauer P225); Pistol P225 disclosed on http://www.remtek.com/arms/before or on Aug. 16, 2000.###.

* cited by examiner

Figure 1, Conventional Compression Spring

Figure 2, Stranded Wire Coil

Figure 8A, Uncompressed Stranded Wire Coil

Figure 8B, Compressed Stranded Wire Coil

MULTI-STRANDED COIL SPRING

CROSS-REFERENCE TO RELATED PATENT APPLICATIONS

This application is a continuation of and claims priority to U.S. Ser. No. 10/782,050, filed Feb. 19, 2004, which is a continuation-in-part of and claims priority to U.S. Ser. No. 10/688,852, filed Oct. 15, 2003, which is a continuation-in-part of U.S. Ser. No. 10/371,177, filed Feb. 19, 2003; and U.S. Ser. No. 10/782,050, filed Feb. 19, 2004 also claims priority to U.S. Prov. App. Ser. No. 60/512,115, filed Oct. 17, 2003. All of the above are incorporated herein by reference in there entirety.

FIELD OF THE INVENTION

The invention relates generally to spring construction, and more particularly, in one embodiment, to multi stranded coil springs.

BACKGROUND OF THE INVENTION

A standard bed construction that has been popular for some time includes a frame for supporting a box spring. The box spring, in turn, is designed to support a mattress. Mattresses are available in a variety of sizes and are also constructed in various ways. One such construction that has proved to be highly desirable includes the use of an innerspring having a plurality of discrete coil springs, which can be encapsulated in individual fabric pockets joined together in a string. An assembly of this type is commonly known as a Marshall construction. Once the strings of coils are formed, they may be arranged, for example, in a chevron or other pattern to provide an innerspring assembly in which the individual springs have longitudinal axes oriented parallel one to another and the springs are closely packed together in an array having a generally rectangular shape in plan with the ends of the springs lying in a common plane. A suitable quilted foam pad may then be used to cover the innerspring and provide a generally planar surface on which a person can sleep. Preferably, the innerspring is covered on both sides and has fabric edging connecting the opposed surface covers, thereby defining a unitary mattress assembly.

Conventionally, each spring is manufactured from a single, solid, coiled steel wire. The spring characteristic is defined, for example, by the wire size and spring dimensions (pitch, coil length, coil diameter, etc.), which can be selected according to the desired properties of the seating or resting surface of the article of furniture or mattress in a manner known in the art.

One disadvantage in the above described conventional solid wire spring construction is that steel that is suitable for this type of spring can be costly. Another disadvantage is that if one or more of the springs malfunction (e.g., break), the seating and/or sleeping comfort of the seating or resting surface is impaired. Therefore, it would be desirable to provide a spring construction that is less expensive to manufacture than a solid wire spring, and that retains or improves upon the performance characteristics of the solid wire spring.

SUMMARY OF THE INVENTION

The invention addresses the deficiencies in the prior art by, in one aspect, providing a coil spring assembly including, a plurality of strands configured as a multi-strand cord, the multi-strand cord coiled into a first helical spring having four or more active coils, at least one inactive coil forming a closed end, and a free height of at least about four inches. Although the coil of the invention has many potential applications, according to one feature, it is uniquely sized for providing support in a resting surface, such as in a mattress or other article of furniture. In some constructions, the strands of the cord are twisted together, while in other constructions the strands are braided together. According to some embodiments, two, three or more strands are twisted together into the multi-strand cord. In other embodiments, three or more strands are braided together into the multi-strand cord.

In one construction, the strands are formed from solid steel wire. However, in other constructions, the strands may be formed, for example, from bronze, aluminum, plastic, copper, titanium, rubber or any other suitable material.

According to one configuration, the strands of the cord are all made from the same material. However, in alternate constructions, at least one strand is made from a different material than at least one other of the strands. Additionally, in some embodiments, the strands all have about the same cross-sectional diameter (i.e., gauge). However, in other embodiments, at least one of the strands has a gauge that is different from at least one other of the strands. In one preferred construction, all of the strands of the cord have substantially the same cross-sectional shape. However, in alternate constructions, at least one of the strands has a cross-sectional shape different from at least one other of the strands.

According to one preferred embodiment, the multi-strand cord is formed as a continuous, single segment cord. However, in alternate embodiments, the cord includes a plurality of longitudinal segments, axially connected end-to-end to form a single cord. According to some such constructions, at least one of the cord segments includes one or more strands formed from a different material than at least one of the strands in another of the cord segments. According to other such constructions, at least one of the segments includes multiple strands and at least one of the segments is single stranded. In a variation of this embodiment, at least one of the strands of the multi-strand cord includes multiple segments, and at least one of the strands of the multi-strand cord is formed as a continuous signal segment strand. In one such constructions, at least one of the strand segments is formed from a different material than at least one other of the strand segments. According to one feature, through such segment configurations providing differing elastic properties, the advantages of the invention can be employed to form a spring assembly having a variable spring rate.

To lessen the adverse effects caused by rubbing of the strands against each other and wear, according to one configuration, one or more of the strands are coated, sealed or otherwise surface treated prior to being formed into the multi-strand cord. By way of example, the strands may be coated with a plastic, epoxy or PTFE (Teflon). The strands may also be protected by a metallurgical process, such as by galvanizing or anodizing. Alternatively or in combination, the multi-strand cord may itself be coated, sealed or otherwise treated, for example, with an epoxy or plastic. According to one embodiment, the multi-strand cord is sleeved in, for example flexible plastic or rubber. In some embodiments, the first helical spring is substantially encased in a foam-like or rubber-like material subsequent to assembly.

The strands of the multi-strand cord, in one construction, are joined together, for example, at one or both terminal ends. Additionally, or alternatively, the strands may be joined together at locations along its length. Fastening mechanisms, include welding, brazing, crimping, bushings or any other suitable joining mechanism and/or technique.

According to one preferred embodiment, all of the coils of the first helical spring have substantially the same outside diameter. However, in other embodiments, the coil diameters may decrease in progression from one terminal end of the end of the spring to the other. In another embodiment, the coil diameters are varied to form any desired pattern, such as for example, decreasing in progression from a first terminal end of the helical spring toward a mid point in the spring and then increasing in diameter progressing from the mid point to a second terminal end of the spring.

In a preferred embodiment, each of the active coils of the first helical spring have substantially the same pitch. However, in some configurations, the pitch between first and second coils is different from the pitch between second and third coils.

According to another aspect of the invention the spring assembly includes a second helical spring positioned concentrically inside the first helical spring. According to one feature, the second helical coil can include any of the features of the first helical spring, including being formed from a multi-stranded cord. The first and second coils may be attached at one or both terminal ends and/or at locations along their lengths.

According to another aspect, the invention provides a resting surface assembly, such as a mattress assembly, including a plurality of coil springs arranged to define a core structure, wherein at least a subset of the coil springs are multi-strand coil springs fabricated from a multi strand cord. In one configuration, the multi-strand coil springs are positioned in substantially parallel alignment to each of the coil springs that are not part of the subset. The multi-strand coil springs and the coil springs that are not part of the subset are placed side-by-side. According to another aspect, the invention provides, a rest surface assembly, such as a mattress assembly, including a plurality of coil springs arranged to define a core structure, wherein at least a subset of the coil springs includes a composite coil spring, with a first section of the composite coil spring being fabricated from a plurality of strands and a second section of the composite coil spring adjoining the first section in a longitudinal spring direction being fabricated of a single strand. Adjoining end portions of the first and second section are rigidly connected with each other.

Additional embodiments may include one or more of the following features. The coil springs forming the core can be single strand coil springs or multi-strand coil springs, and the coil springs may have different spring rates. The coil springs may also have a variable, such as a non-linear and/or progressive, spring rate. To add support and simplify manufacturing, at least a portion of the coil springs and the multi-strand coil springs can be surrounded by a foam or rubber-like material. Alternatively, the entire core can be encased in the foam or rubber-like material. The multi-strand coil springs can also be implemented as pocketed springs.

Further features and advantages of the invention will be apparent from the following description of preferred embodiments and from the claims.

BRIEF DESCRIPTION OF THE DRAWINGS

The following figures depict certain illustrative embodiments of the invention in which like reference numerals refer to like elements. In these figures, like reference designations refer to like parts, and the various parts may not be drawn to scale.

DESCRIPTION OF CERTAIN ILLUSTRATED EMBODIMENTS

The multi-strand coil springs described herein can be used, for example, to construct a wide variety of coiled spring applications, including seating and resting surfaces of articles of furniture. In particular, the multi-strand coil construction can be a more versatile replacement for single strand or solid coils in mattresses, providing enhanced utility and performance. For purpose of illustration, the coils described herein will be described with reference to pocketed coil mattresses. However, the invention is not so limited, and may be employed with other coil spring applications including, but not limited to, seating, flooring, weaponry, writing instruments, spring hinge designs, spring locking mechanisms, spring wound motors, specialized medical applications, industrial tools, spring brake devices, resilient shock absorption applications and the like.

Figure 1:
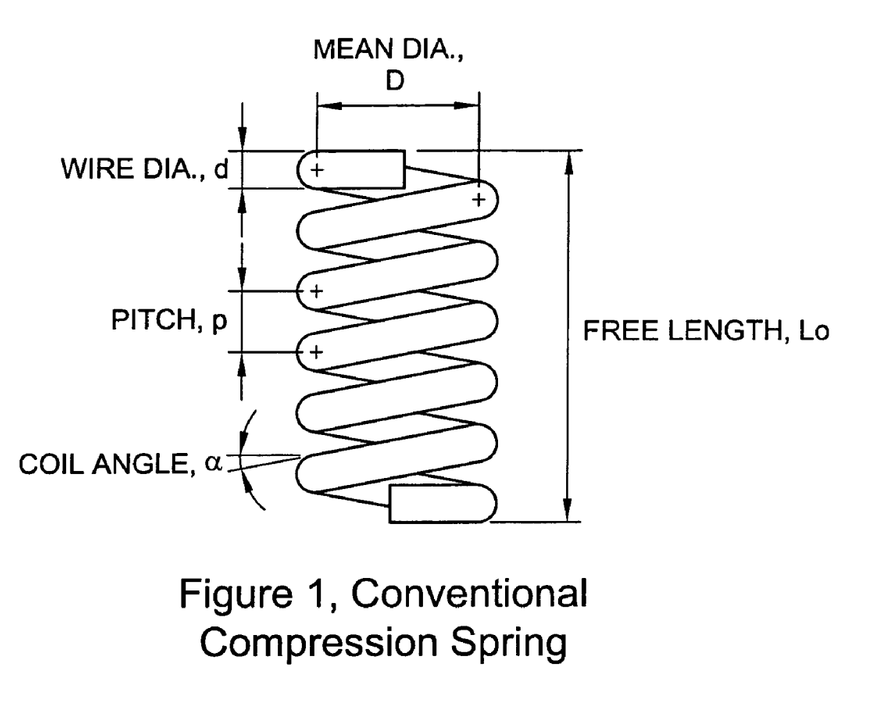
FIG. 1 shows schematically a conventional closed end coil spring.

FIG. 1 illustrates the basic geometric parameters defining a helical compression spring. The primary spring geometric design parameters are: Free Length ($L_o$) representing the length of the unloaded spring; Diameter (d) representing the diameter of the wire or other material that is wound into the helical spring; Coil Diameter (D) representing the mean diameter of the helical spring, i.e., ($D_{outer}+D_{inner}$)/2; and Total Number of Coils ($N_t$) representing the number of turns in the helical spring. Other useful design parameters are: Active Coils ($N_a$) representing the number of coils which deform when the spring is loaded, as opposed to the inactive turns at each end which are in contact with the spring seat or base, but do not substantially deform; Solid Length ($L_s$) representing the minimum length of the spring, when the load is sufficiently large to close all the gaps between the coils; and Pitch (p) representing the distance from center to center of the wire in adjacent active coils. Springs in seating and resting surfaces of articles of furniture typically employ closed end springs of the type illustrated in FIG. 1. Closed end springs typically have at most one inactive coil at each end of the spring.

The selection of the spring material is usually the first step in parametric spring design. Material selection may be based on a number of factors, including temperature range, tensile strength, elastic modulus, fatigue life, corrosion resistance, cost, etc. High-carbon spring steels are the most commonly used of all springs materials. They are relatively inexpensive, readily available, and easily worked. Examples include Music (ASTM A228) wire and Hard Drawn (ASTM A227) wire, which are suitable for springs used, for example, in mattresses. Spring wires can be surface-treated, such as by being galvanized or coated with a plastic or epoxy.

Spring wire used in mattress coil spring construction typically has a diameter of between about 0.06" (16 gauge) and about 0.09" (13 gauge), with each coil spring made of a single strand of spring wire. The exact design parameters for mattress coil springs depend, for example, on the desired firmness, which is in addition determined by the number of springs per unit surface area of the mattress. Both single strand and, according to the invention, multi-strand coils can be designed to have a variable spring rate, meaning that the spring excursion varies non-linearly with the applied load.

Figure 2:
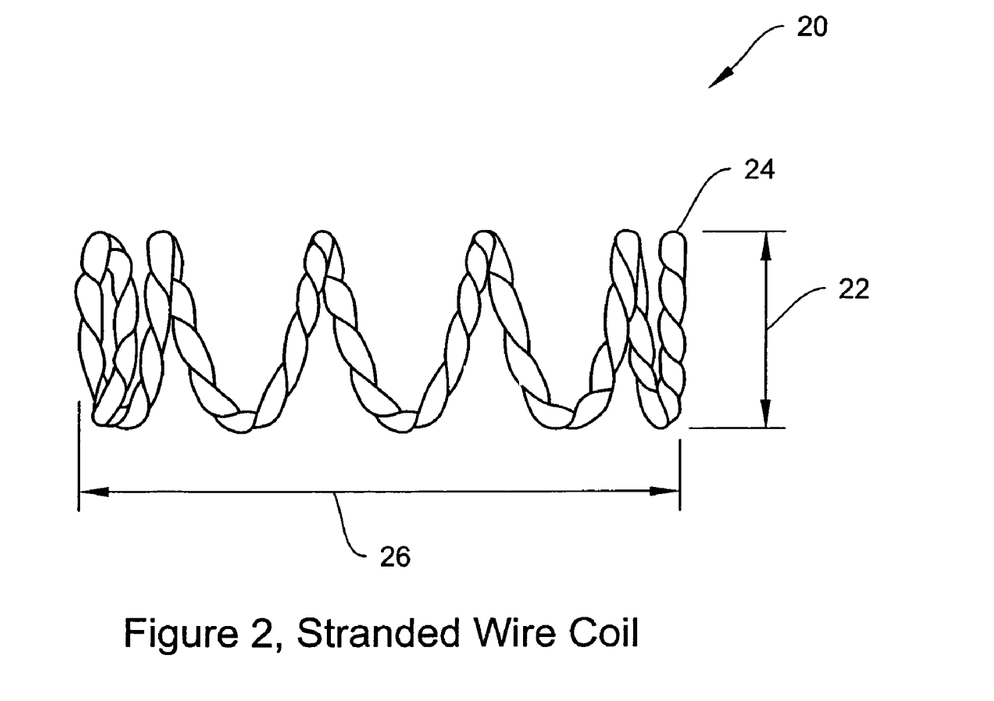
FIG. 2 shows schematically a multi-strand coil spring according to an illustrative embodiment of the invention.

FIG. 2 shows schematically a multi-strand coil spring 20 according to an illustrative embodiment of the invention. The coil spring 20 employs a multi-strand cord 22, which is bent to form the coil spring 20. Preferably, at least two strands are twisted to form the multi-strand cord 22. However, the number of strands employed varies according to the application and the type of material used to form the strands. In some constructions, the cord 22 is formed from braiding three or more strands. In one preferred construction, the multi-strand cord 22 includes from three to about fifty braided strands. As described below, testing by applicants has shown that coil springs formed from multi-strand cords, braided or twisted, have improved performance characteristics over conventional single strand spring.

The illustrative coil spring 20 is closed ended and formed from three strands. It has an outside diameter 22 of about 2" and an $N_t=6$ coils, with one coil 24 being an inactive coil, as defined above. An exemplary free length $L_0$ 26 is between about 5" and about 6". The spring 20 can be made, for example, of carbon steel, such as ASTM A227/A228, with each strand having an outside diameter of about 0.514" (1.3 mm), which is equivalent to a about 17½ gauge. With these parameters, the spring rate is about 1.4 lb, which gives the following characteristic:

| Approximate Working Deflection (inches) | Approximate Working Load (lbf) |
|---|---|
| 0.75 | 1.07 |
| 1.0 | 1.43 |
| 2.5 | 3.57 |
| 3.0 | 4.28 |

The fatigue performance of the illustrated multi-strand spring design is estimated to be between about 100,000 and about 1,000,000 operation cycles at about 2.75" deflection, which corresponds to a useful life of about 15 years. The efficiency and performance of the spring is understood to increase with the number of strands. However, the cost also tends to increase with the number of strands. Applicants estimate that the spring will suffer no more than about 5% relaxation over 15 years when deflected by about 2.75".

A significant advantage of the invention is that multi-strand springs are essentially fault tolerant in that they remain functional even when one or more of the strands break. The strands may be twisted, woven, clipped or bonded together, and any suitable method for forming the multi-strand coil spring may be employed without departing from the scope of the invention. The strands may be formed, for example, from steel, aluminum, plastic, copper, titanium, rubber or any other suitable material, with the type of material selected depending on the application at hand. Morever, the strands may have an ovular, circular, hexagonal, square, flattened version of any of the preceding or any other suitable cross-sectional geometry, and may be formed into any number of coils. Additionally, the strand gauge may vary according to the application, and in one embodiment is about 710 gauge, although other gauges may be used. Also, the coils themselves may be formed as active or inactive coils, and may all have substantially equal Coil Diameters (D). Alternatively, the Coil Diameter (D) may vary from coil to coil, and may be arranged, for example to have sequentially increasing Coil Diameters (D), Sequentially decreasing Coil Diameters, or some combination of both, to form any suitable coil diameter pattern, for example, for forming a coil spring having a variable spring rate. Other ways to form coils having a variable spring rate are discussed below with respect to FIG. 6.

Additionally, although the coils are depicted as being substantially circular in geometry, they may be oval, hexagonal, rectangular, square or any other suitable geometry. Further, although the Pitch (P) is depicted in FIG. 2 as being substantially constant from active coil to active coil, this need not be the case and the pitch may vary from active coil to active coil.

The exemplary multi-strand coil spring 20 can be fabricated by initially providing the individual strands with a helical twist prior to the cording operation. The helix of the multi-strand spring preferably opposes the helix of the individual strands to counteract a tendency of the strands to loosen when the spring is operated, i.e., compressed. Additionally, as with conventional springs, a torque is applied to the cord during coiling.

In one practice, coiling may be achieved by passing a braided cord through a coiler, such as the type of coiler employed for forming steel mattress coils, wherein a heavy-gauge steel wire is compressed into a barrel-shaped coil such that no turns touch for eliminating noise and vibration. The coils may then be passed to a pocketing machine or station to pocket the springs into individual sleeves of a non-woven, non-allergenic fabric such as Duon. Each sleeve is ultrasonically sealed by a process where the fibers are melted together to form solid plastic seams, which are secure and tear-resistant. The coils are then fusion bonded to produce a strong, stable construction. The number of coils in each unit may vary, and the types of coils and the number of strands and gauge of strands can vary from pocket to pocket, and multi-strand coils may be employed in combination with single strand coils.

The individual strands are connected to each other at least at the ends of the coil. Since the strands can rub against each other over the length of the coil, which can cause fretting and premature wear, the strands may be coated and/or pre-galvanized or otherwise treated. Moreover, the multi-strand coil may also be sealed/coated with a sealant, such as an epoxy.

According to one feature, the various strands of the multi-strand coil spring 20 may be made of differing materials, for example, different types of metals, such as bronze, titanium and the like, as well as various types of spring steels having different elastic properties. In this way, the elasticity of the spring, or the spring rate, can be tailored to specific applications, without the need to acquire or stock a large quantity of conventional dissimilar coil wires. Other elastic materials having spring-like properties, for example suitable plastics, may also be used.

To lessen the risk of the strands fretting, the strands can be selectively welded at predetermined locations along the length of the multi-strand cord, either when the multi-strand cord is fabricated or when the coil is being formed. The coil can thereafter be coated or galvanized along the multi-strand cord, or the entire coil may be encased in a foam-like or rubber-like material, which can be poured or wrapped around the coil strands. Alternatively or in addition, a coil can be completely surrounded by a "block" of foam-like or rubber-like material, or the entire mattress core may be filled with foam. This can add lateral stability to the multi-strand coil springs and/or, if the foam is impervious to air, can protect the coil springs from environmental effects.

Figure 3:
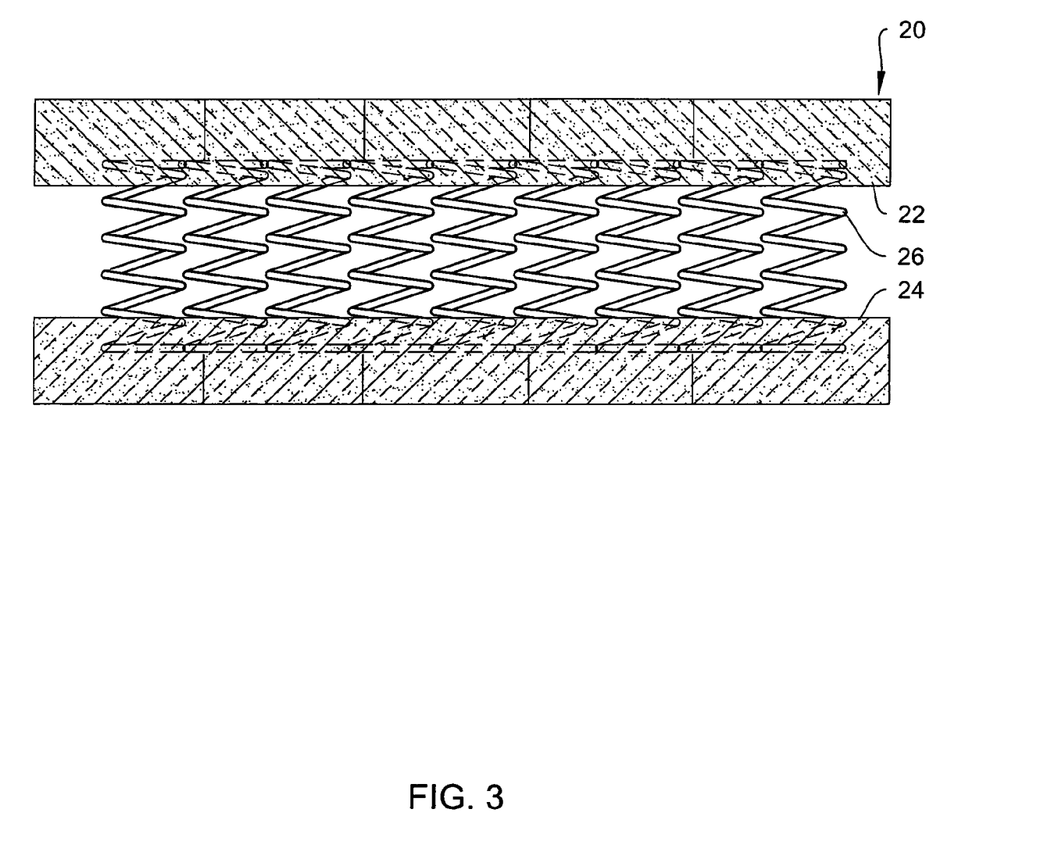
FIG. 3 shows a cross sectional view of a mattress with coils of the type depicted in FIG. 2 having ends embedded in a foam/rubber-like material according to an illustrative embodiment of the invention.
Figure 4:
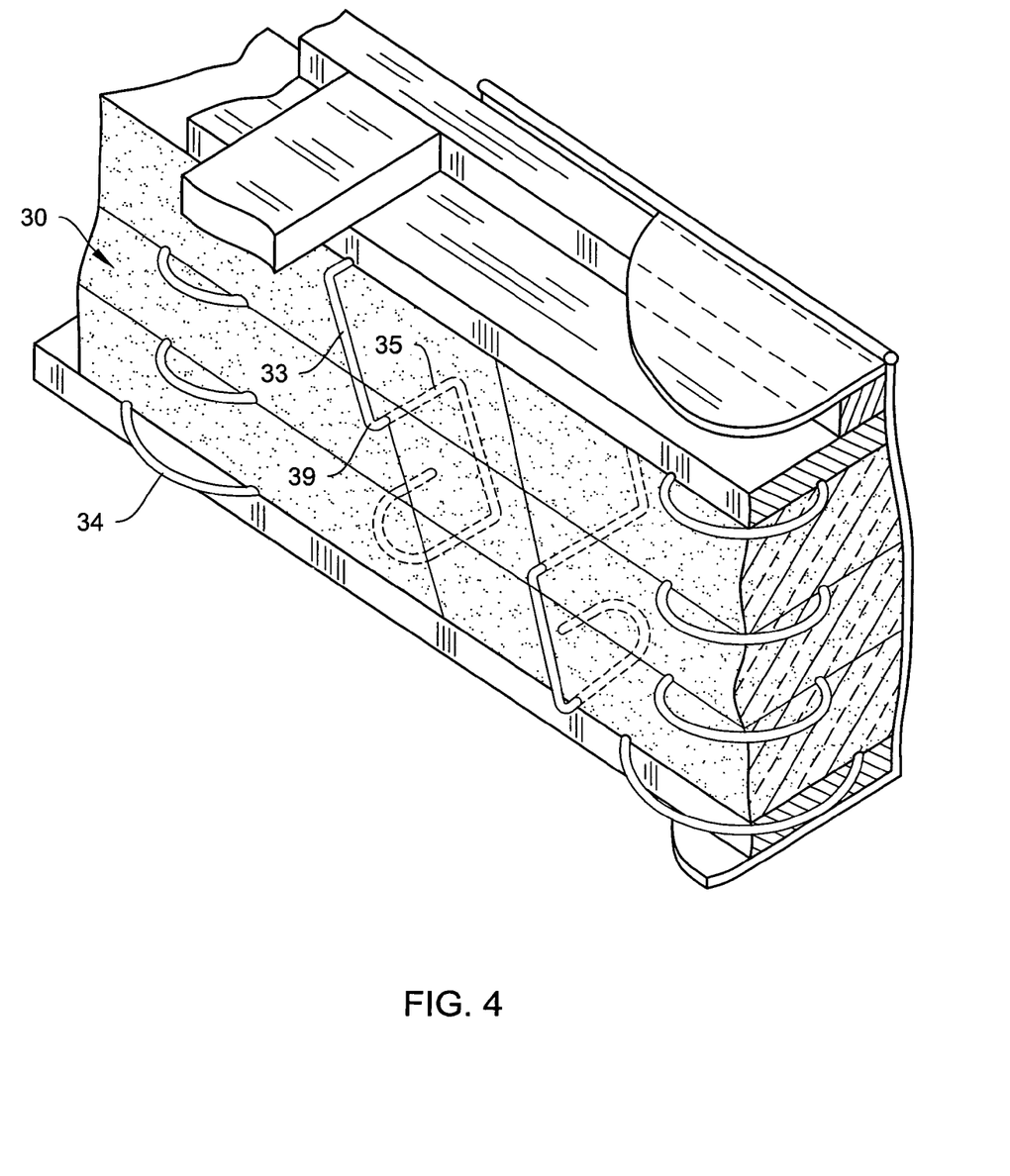
FIG. 4 depicts a fragmentary perspective view of springs of the type depicted in FIG. 2 inserted in a slotted foam/rubber support.
Figure 5:
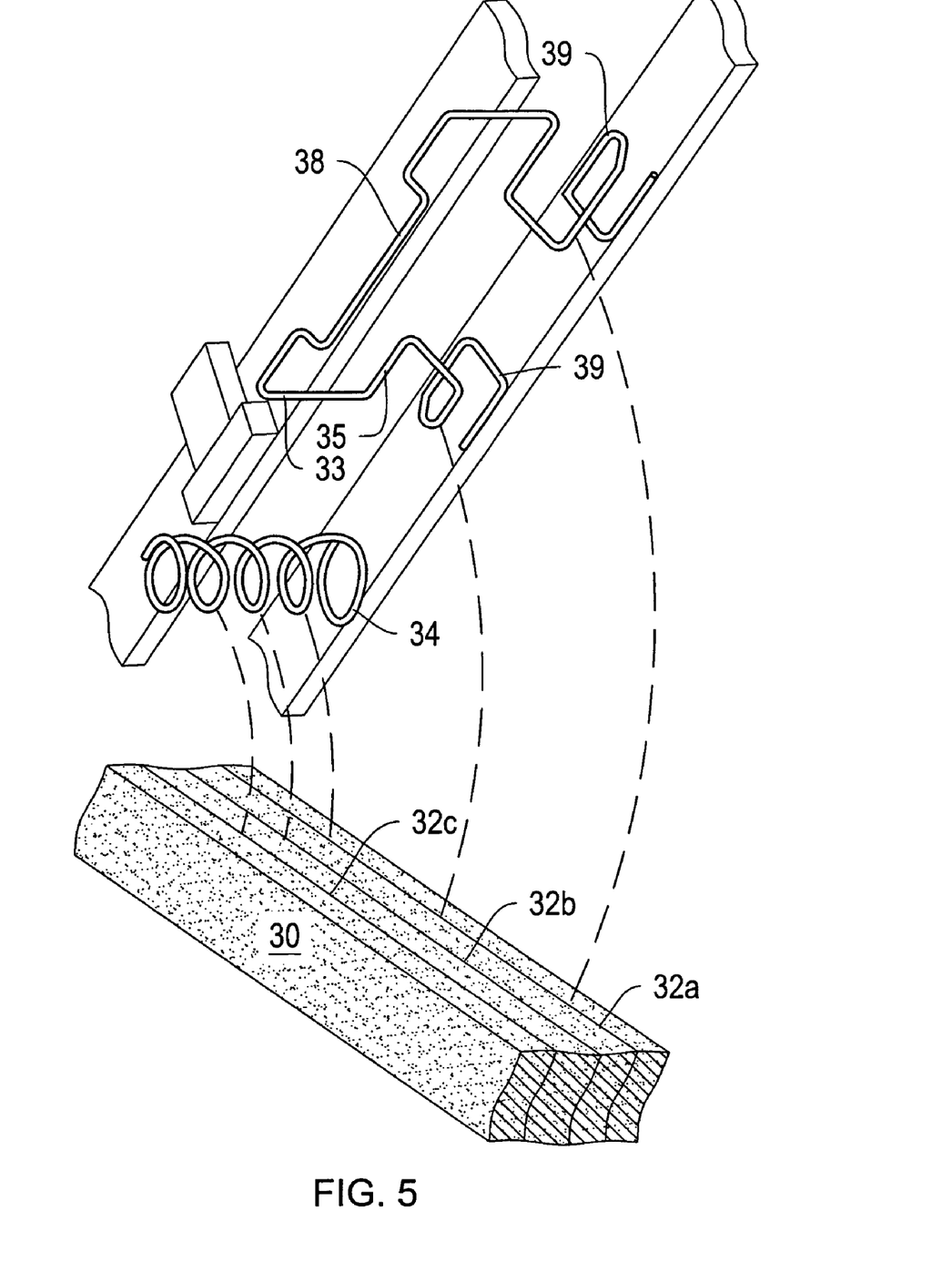
FIG. 5 shows an exploded fragmentary perspective view of the springs and slotted foam/rubber support of FIG. 4.

FIG. 3 depicts a section of a mattress 20 constructed with multi-strand wire coils 26 whereby additional support is provided by encasing at least the end sections of the springs in the foam 22, 24. Other resilient materials, such as rubber and/or latex, can also be used. This arrangement obviates the need for connecting the ends of the springs individually to a frame or to each other and can furthermore provide a sleeping surface adapted for the comfort of a user. According to one feature, the illustrative construction advantageously provides additional lateral support for the multi-strand coils. Turning now to FIGS. 4 and 5, support for the multi-strand coil springs and the mattress construction in general may also be improved by placing foam 30 between or around the coil springs 34, for example, by slitting the foam 30 substantially parallel (32a, 32b, 32c) to the spring turns (see FIG. 5) and pressing the foam into the sides of the coil spring. This approach makes it possible to reduce the number of springs in a mattress, thereby reducing also the weight and the manufacturing costs of the mattress. The resiliency of the mattress which is related to the desired sleeping comfort of a user, can be further tailored to the user's needs by completely encasing the multi-strand coil springs in foam. A foam with sealed pores can furthermore protect the multi-strand coil spring from corrosion, which is even more important for multi-strand coil springs than for solid wire springs due to the larger surface-to-volume ratio of the multi-strand coil springs and potentially developing weak spot on the spring surface caused by fretting, as described above.

Multi-strand coil springs that are enclosed/encased in foam need not be arranged in a regular pattern and springs with different spring rates can be easily incorporated. In this way, a mattress having a different softness in different areas of the sleeping surface can be easily constructed by placing springs with different spring rates in any desired pattern. Since the foam-encased springs, preferably, do not need additional mechanical reinforcement (in addition to the foam) and do not have to be interconnected, for example, by hog rings or tie wires, the mattress design can be implemented easily, and quickly changed, without additional tooling, which also reduces manufacturing costs.

As also seen in FIGS. 3 and 5, other types of spring elements 39, such as vertical springs, can also be fabricated from a multi-strand cord and additionally supported by or encased in foam 30. The orientation of the slits can be arranged so as to match the orientation of the individual sections 33, 35 of the spring elements. Moreover, adjacent springs 34 and/or spring elements 39 can be connected in an alternating arrangement, whereby a top section of a spring element 39 is connected to the top section of an adjacent spring element 39 by cross-wire 38, with the bottom section of a top-connected spring element 39 then connected to a bottom section of the next spring element 39 (not shown), and so on. In this way, a succession of springs can be manufactured from a continuous wire (either solid or braided/stranded) without separating the individual springs.

Moreover, FIG. 5 illustrates that the multi-strand springs 34 may be arranged in a row that extends along at least a portion of the length of the mattress. In one practice, the multi-strand springs 34 are arranged as an edge support disposed at the peripheral edge of the mattress and capable of providing a more robust and firm edge for the mattress. To this end, the multi-strand springs may have a spring constant that is greater than the spring constant of other springs employed within the mattress. The firmness of the multi-strand springs 34 may be selected for the intended purpose of providing greater support, and in particular, sufficient support to allow a person to sit comfortably on the edge of the mattress, without the mattress edge collapsing under the person's weight. The edge support may be provided to the lateral edges of the mattress or may be applied around the full periphery of the mattress.

Figure 6:
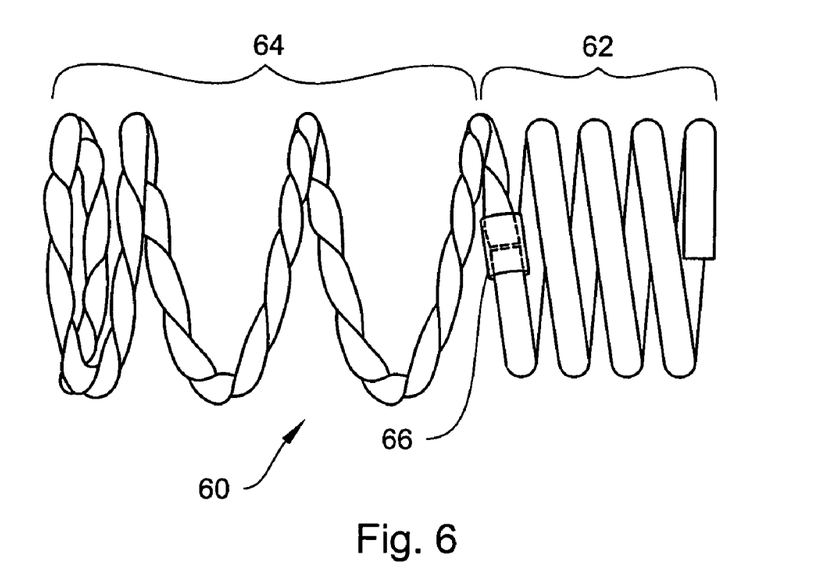
FIG. 6 shows an exemplary composite spring made from two spring segments according to an illustrative embodiment of the invention.

FIG. 6 illustrates an exemplary embodiment of a spring 60, which can have a variable spring rate. The multi-strand wire coils of the invention can be employed in the design of such a spring. A spring 60 with a variable spring rate can provide a mattress sleeping surface that has a "soft" response if less pressure exerted by a user (i.e. if the weight of the user is relatively low), with the response becoming "harder" for heavier users. A first section 62 of the spring 60 may be manufactured, for example, from a solid coil wire having a first, typically lower spring rate (stiffer spring). A second section 64 may be implemented, for example, as a multi-strand coil wire and attached to an end of the section 62, for example, by crimping a sleeve 66 over the adjoining end portions of each section 62, 64. The sleeve 66 can be made of metal or a sturdy plastic that can withstand the applied torsion and other forces. Other means for connecting the sections 62 and 64, with or without a sleeve 66, may include, for example, welding or brazing.

One desirable quality of multi-strand coil springs is that for the same cord diameter and same cord material, multi-strand coil springs have a greater spring rate than single strand coil springs. As a consequence, employing the multi-strand springs of the invention, the spring 60 can be configured such that the multi-strand section 64 compresses under a first load, giving the "soft" response, and the single strand section 62 thereafter compresses under an increased load relative to the first load to provide the "harder" response relative to the section 64. The response can be further adjusted, for example, by inserting foam (30; see FIGS. 4 and 5), as described above.

Figure 7:
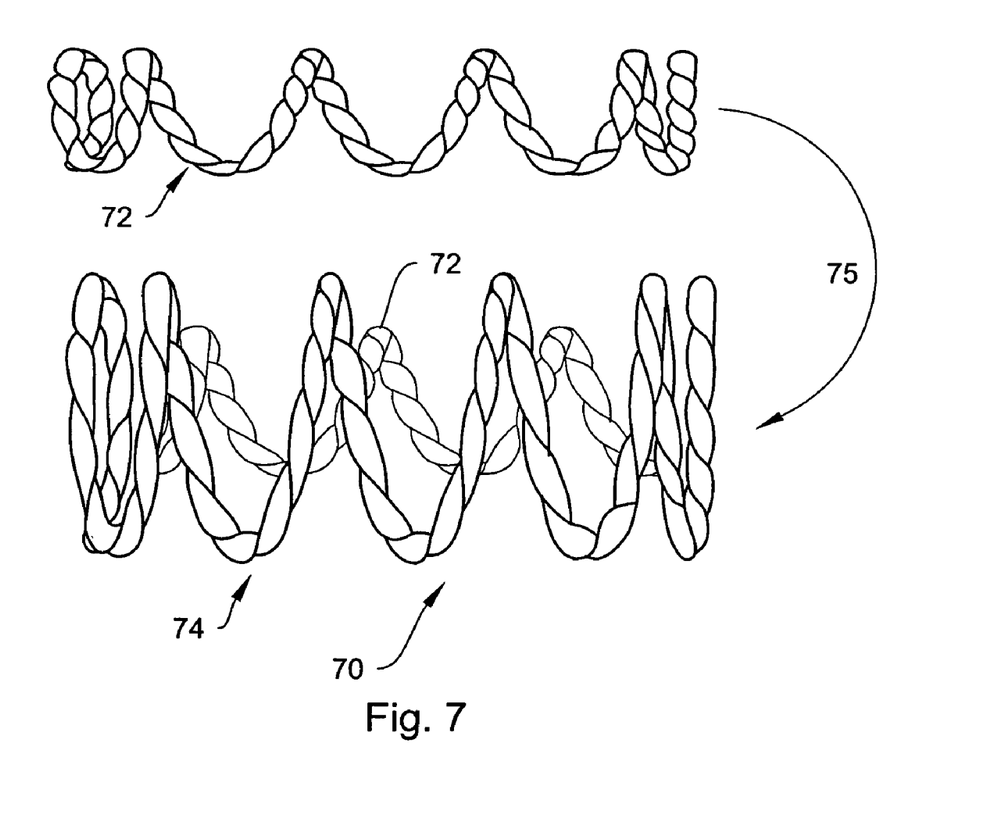
FIG. 7 depicts a coil-in-coil spring assembly made from multi-strand coil springs of the type depicted in FIG. 2.

In another exemplary embodiment depicted in FIG. 7, a multi-strand coil 72 is inserted into and/or affixed inside another (multi-strand wire) coil spring 74 of a larger diameter to create a combined spring 70. By selecting the above described spring parameters of the inner 72 and outer 74 springs, the combined spring 70 can be configured to have a desired constant or variable spring rate, thus providing similar advantages to the hybrid spring 60 of FIG. 6. Either or both coil springs 72 and 74 can be made from a multi-strand cord, braided cord or single strand, or can have the split coil configuration depicted in FIG. 6. According to one feature, a mattress core or other resting surface of an article of furniture may be manufactured by first arranging outer coil springs in a desired pattern and then selectively placing multi-strand wire coils inside the outer coil springs. The inner coils can be secured to the outer coils in a conventional manner, for example, with hog rings, wire, straps, etc. The manufacture may be particularly simplified by using the foam construction depicted in FIGS. 3-5, in which case the inner coil springs may simply be placed inside the outer springs without additional mechanical attachment to the outer coil spring, before the foam is applied.

Figure 8A:
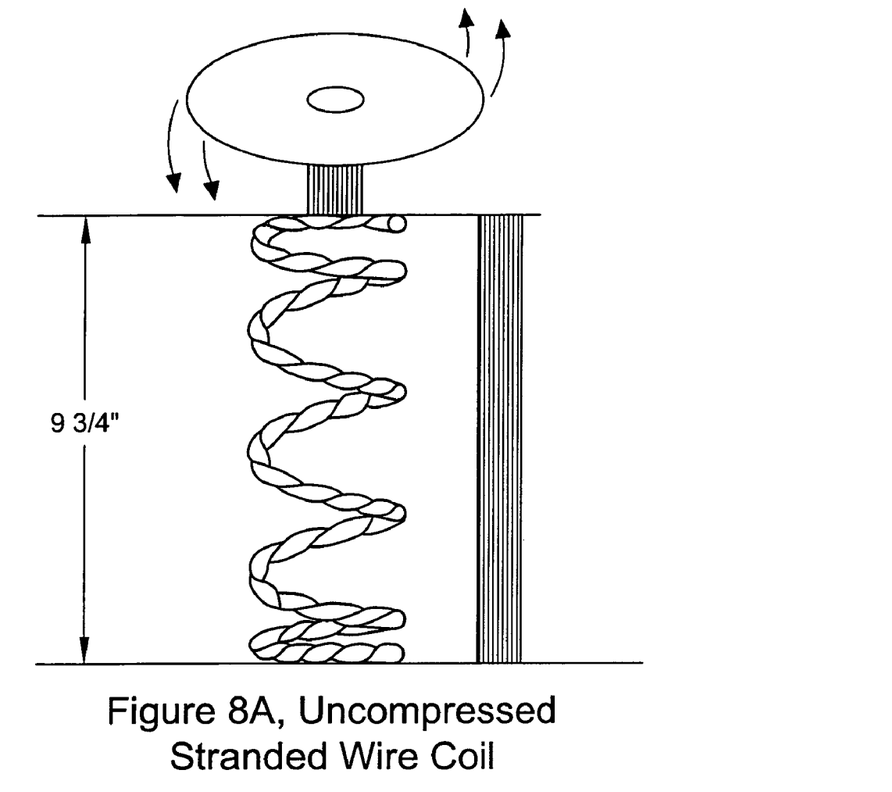
FIGS. 8A and 8B depict a multi-strand coil spring of the type shown in FIG. 2 flexing under force.
Figure 8B:
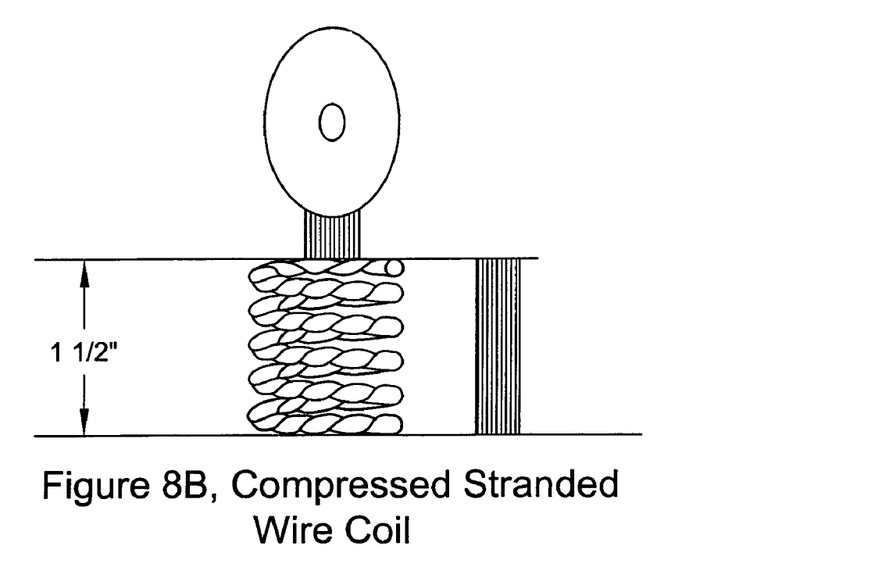

FIGS. 8A and 8B show the exemplary multi-strand coil spring illustrated in FIG. 2 during flexing. Testing results demonstrate that a three cord multi-strand coil spring having strands of steel with an average gauge will withstand about 4.4 million coil flexes from a height of about 9¾ inches (FIG. 8A) to a height of about 1½ inches (FIG. 8B) without separation. The coil spring is formed utilizing a commercial coiler machine and the steel strands have no bands or coating. Multi-strand coil springs of the type utilized possess adequate performance characteristics for a wide variety of coiled spring applications and may be tailored to specifically perform even more applications. Such applications include furniture uses, particularly rest surfaces, such as mattresses exemplified by the previously discussed embodiments, and other general coiled spring uses. These other applications include, but are not limited to, weaponry, writing instruments, spring hinge designs, spring wound motors, spring locking mechanisms, specialized medical applications, industrial tools, spring brake devices, and other resilient shock absorption applications.

In another practice, a multi-strand cord of the type used to produce multi-strand coil springs can also be used as conventional border wire in mattress construction instead of a single strand border wire. More generally, multi-strand cords and multi-strand coils made from such cords can replace single strand wire and single strand coils in many applications, such as in yielding and non-yielding box springs or other mattress or resting surface support structures.

According to one practice, the multi-strand springs described above can be formed from a multi-strand cord using a suitable coil winding machine that eliminates torsion in the feed cord, such as the coil winding machine disclosed in commonly assigned U.S. Ser. No. 10/661,363, entitled "Methods for Manufacturing Coil Springs", which is incorporated herein by reference in its entirety. Such continuous coils from multi-strand wire may perform best if wound by maintaining the same winding sense between coils so as to prevent the individual strands from loosening during spring compression.

While the invention has been disclosed in connection with the illustrated embodiments shown and described in detail, various modifications and improvements thereon will become readily apparent to those skilled in the art. For example, the multi-strand springs described herein as coil springs can have other suitable shapes, diameters or heights. The mattresses or other resting surfaces can be one sided and unidirectional. They springs of the invention can be main springs and joey coils, and optionally, provide for multiple and different firmnesses under differing loads. They may also be employed to provide resting surfaces having particularly configured gradients of firmness across the resting surface. The multi-strand coil springs can be used in pocketed coil mattresses and open-coil mattresses. They can be used in seat cushions, car seat cushions and sofas. Additionally, they may be employed a replacement for single strand coil springs, wherever coil springs are employed. By way of example, the multi-strand springs of the invention may be employed in office supplies, such as pens, hole punches and staplers. They may also be employed in weaponry, including spring guns. They may also be used in specialized medical applications, including those expressly tailored for a particular patient procedure. They can be used in spring hinge designs, spring locking mechanisms, and spring brake designs. They can also be used in a variety of industrial tools, including nail guns, spring motors, welding clamps and circular saws. They may also be used in resilient shock absorption systems. They may also be employed in internal combustion engines, such as for lifer springs. Accordingly, the spirit and scope of the invention is to be limited only by the following claims.

What is claimed is:

1. A method of manufacturing a mattress assembly with a plurality of encased multi-stranded coil springs, each having a first terminal end and a second terminal end, arranged to define a mattress core, comprising:

forming a spring wire being helically twisted in a first twist direction, with respect to the first terminal end;

combining a plurality of the helically twisted spring wires and twisting the combined spring wires in a second twist direction, with respect to the first terminal end and opposite the first twist direction to form a stranded coil spring;

encasing the multi-stranded coil spring in a pocket to form a encased multi-stranded coil spring; and positioning the encased multi-stranded coil spring in substantially parallel alignment to the other plurality of encased multi-stranded coil springs.

2. The method of claim 1, further comprising joining the plurality of stranded wires at least one of the respective ends of the spring and a plurality of locations along the spring.

3. The method of claim 1, further comprising applying at least one of a plastic coating, epoxy coating, PTFE coating, sealant, and anodizing surface treatment to at least one of the plurality of spring wires and the multi-stranded coil spring.

4. The method of claim 1, wherein at least one of the plurality of wires is formed from a different material than another one of the plurality of wires.

5. The method of claim 1, wherein at least one of the plurality of wires has a plurality of segments, with at least one of the segments formed from a different material than another one of the plurality of segments.

6. The method of claim 1, wherein the multi-stranded coil spring has a plurality of segments, with at least one of the segments formed from a different material than another one of the plurality of segments to provide a variable spring rate.

7. The method of claim 1, wherein at least one of the plurality of wires has an outside diameter different from that of another one of the plurality of wires.

8. The method of claim 1, wherein the multi-stranded coil spring has a plurality of coils, and wherein at least one of the coils has an outside diameter different from another one of the plurality of coils.

9. The method of claim 1, wherein the multi-stranded coil spring has a plurality of coils, and wherein the coils each have an associated outside diameter and the outside diameter of each subsequent ne of the coils is less than the outside diameter of each prior one of the coils progressing from the first terminal end of the coil spring to the second terminal end of the coil.

10. The method of claim 1, wherein the multi-stranded coil spring has a plurality of coils, and wherein:

a first coil is located near the first terminal end of the coil spring;

a second coil is located near the second terminal end of the coil spring; and the first and second coils each have an outside diameter larger than one of the plurality of coils located intermediate to the first and second coils.

11. The method of claim 1, wherein the multi-stranded coil spring has a plurality of coils, and wherein a pitch between a first coil and a second coil is different from a pitch between the second coil and a third coil.

12. The method of claim 1, wherein the multi-stranded coil spring is formed without a central wire.

13. The method of claim 1, wherein forming a spring wire being helically twisted in a first twist direction includes passing a twisted wire braid though a wire coiler machine.

14. The method of claim 1, further comprising positioning the encased multi-stranded coil spring in substantially parallel alignment to at least one other solid coil spring.

15. A mattress assembly, comprising:

a plurality of encased coil springs arranged to define a mattress core structure, wherein at least a subset of the encased coil springs comprises multi-strand coil springs fabricated of a plurality of wire strands encased in a pocket; and wherein at least one of the encased multi-strand coil springs, each having a first terminal end and a second terminal end, is formed by combining wires helically twisted in a first twist direction, with respect to the first terminal end, and twisting the combined spring wires in a second twist direction, with respect to the first terminal end and opposite e the first twist direction.

16. The mattress assembly of claim 15, wherein at least one strand of the plurality of wire strands is made of a different material than another of the wire strands.

17. The mattress assembly of claim 16, wherein the material is selected from the group consisting of steel, bronze and plastic.

18. The mattress assembly of claim 15, wherein each of the wire strands has a helical twist with a direction that is opposite to a twist direction of the multi-stranded coil spring.

19. The mattress assembly of claim 15, comprising at least three wire strands.

20. The mattress assembly of claim 15, wherein the wire strands are provided with a protective coating selected from the group consisting of galvanized exterior, plastic and epoxy overcoating.

21. The mattress assembly of claim 15, wherein the multi-strand coil spring is provided with a protective coating.

22. The mattress assembly of claim 15, wherein the multi-strand coil spring is constructed so as not to have a central wire.

23. The mattress assembly of claim 15, wherein a second subset of the encased coil springs comprises encased solid coil springs fabricated of a single wire strand encased in a pocket.

* * * * *